(12) United States Patent
Okamoto

(10) Patent No.: US 6,614,855 B1
(45) Date of Patent: Sep. 2, 2003

(54) APPARATUS FOR RECEIVING BROADCASTING SIGNALS

(75) Inventor: Tadashi Okamoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/309,579

(22) Filed: May 11, 1999

(30) Foreign Application Priority Data

May 20, 1998 (JP) ........................................ P10-137898

(51) Int. Cl.[7] ................................................. H03K 9/00
(52) U.S. Cl. ...................................... 375/316; 375/345
(58) Field of Search ................................ 375/259, 260,
375/262, 316, 324, 340, 341, 345, 371;
370/312, 203, 204, 206, 208, 210, 326,
345, 498, 432, 484, 485, 486; 455/3.02,
13.4, 89, 68, 74, 130, 150.1, 334, 341;
748/343; 381/571, 2; 709/219

(56) References Cited

U.S. PATENT DOCUMENTS

| | | | | |
|---|---|---|---|---|
| 5,283,780 A | * | 2/1994 | Schuchman et al. | ........ 370/312 |
| 5,946,292 A | * | 8/1999 | Tsujishita et al. | ........... 370/204 |
| 6,038,275 A | * | 3/2000 | Taura et al. | ................. 375/371 |
| 6,144,707 A | * | 11/2000 | Yoshida et al. | ............. 375/316 |
| 6,178,447 B1 | * | 1/2001 | Wannenmacher et al. | .. 709/219 |
| 6,201,837 B1 | * | 3/2001 | Okamoto | .................... 375/316 |

FOREIGN PATENT DOCUMENTS

| WO | WO 01/50647 A1 | * | 7/2001 | ............ H04H/1/00 |
|---|---|---|---|---|

* cited by examiner

*Primary Examiner*—Stephen Chin
*Assistant Examiner*—Chieh M. Fan
(74) *Attorney, Agent, or Firm*—Jay H. Maioli

(57) ABSTRACT

An apparatus for receiving broadcasting signals includes a signal receiving portion for receiving a broadcasting signal, a frequency convertor for converting the broadcasting signal received by the signal receiving portion, an IF amplifier, an A/D convertor, a digital demodulator, a program selector for selecting one of plural groups of program information data obtained from the digital demodulator, an information reproducing portion for reproducing program information, and an operation controller operative to put at least each of the signal receiving portion, the frequency convertor and the IF amplifier in a reduced power consumption state in periods other than a period in which portions of the broadcasting signal, which carry the synchronous data, the control information data and the program information data to be selected by the program selector, respectively, are able to be received by the signal receiving portion.

10 Claims, 2 Drawing Sheets

APPARATUS FOR RECEIVING BROADCASTING SIGNALS

BACKGROUND OF THE INVENTION

1. Field of the Invention

The present invention relates generally to an apparatus for receiving broadcasting signals, and more particularly, is directed to an improvement in a broadcasting signal receiving apparatus which is operative to receive a broadcasting signal carrying synchronous data, control information data and plural groups of program information data and to reproduce desirous program information based on a group of data selected from the plural groups of program information data carried by the broadcasting signal received thereby.

2. Description of the Prior Art

Although an analog audio broadcasting system which includes an amplitude-modulated (AM) audio broadcasting system in which audio signals are transmitted in the form of an AM audio information signal and a frequency-modulated (FM) audio broadcasting system in which audio signals are transmitted in the form of a FM audio information signal, has been put to practical use for a long time in the field of audio broadcasting, there has been recently proposed to introduce a digital audio broadcasting system in which audio signals are transmitted in the form of a digital audio information signal for the purpose of improving quality of audio information transmitted or received in the system. Especially, in the region of Europe, the digital audio broadcasting system called "DAB" has been already put to practical use in some countries.

The digital audio information signal transmitted from a broadcasting station under the digital audio broadcasting system is called a digital audio broadcasting signal. The digital audio broadcasting signal carries not only audio information data forming a digital audio signal but also service information data representing service information, such as weather forecast, traffic information and so on, and further carries control information data which are necessitated for reproducing the digital audio signal based on the audio information data and the service information based on the service information data on the receiving side. Then, the digital audio broadcasting signal is a modulated wave signal obtained by modulating a carrier wave signal with digital data, such as audio information data, service information data, control information data and so on, in accordance with the Orthogonal Frequency Division Multiplexing (OFDM) system and the digital data transmitted by the digital audio broadcasting signal is composed of a series of frame units, each of which is called a transmission frame.

The transmission frame has a time duration of, for example, 24 ms and contains 77 segmental periods each named Symbol and identified with Symbol 0 to Symbol 76, respectively, as shown in FIGS. 1A to 1C. The Symbol 0 is a null Symbol where the modulated wave signal does not exist in actual fact. The Symbol 1 is a reference Symbol for synchronization. The Symbol 0 which is the null Symbol corresponds to about 324 μs and each of the Symbol 1 to the Symbol 76 corresponds to about 312 μs.

A channel named Synchronous Channel is allocated to the Symbol 0 and the Symbol 1, a channel named Fast Information Channel (FIC) is allocated to the Symbol 2 to the Symbol 4 following the Symbol 1, and a channel named Main Service Channel (MSC) is allocated to the Symbol 5 to the Symbol 76 following the Symbol 4, as shown in FIGS. 1A and 1B. In the Synchronous Channel, synchronous information data DRS are transmitted by the Symbol 1. The MSC is composed of a series of frames each named Common Interleaved Frame (CIF) for transmitting composite data DXD constituted by the audio information data and the service information data. The FIC is composed of a series of blocks each named First Information Block (FIB). The FIB contains a couple of portions of an FIB data field and an error checking word, and the FIB data field is composed of a series of groups each named Fast Information Groups (FIG). The FIC thus formed transmits control information data DCD representing multiplex configuration information (MCI) and other information.

Each of the audio information data and the service information data constituting the composite data DXD transmitted by the MSC contains various groups of program information data, such as program information data 1 to program information data N+M+2, as shown in FIGS. 1B and 1C.

Such a digital audio broadcasting signal as described above is received by use of a digital audio broadcasting signal receiver. In the digital audio broadcasting signal receiver, each of the digital audio broadcasting signals transmitted respectively from a plurality of broadcasting stations is received selectively through a tuning operation by a tuner and the received digital audio broadcasting signal is subjected to radio frequency (RF) amplification, frequency conversion, intermediate frequency (IF) amplification, digital demodulation, decoding processing and so on so that audio information data, service information data and control information data are obtained. Then, the audio information data or the service information data are further subjected to program selection, decoding processing and so on so that digital audio signals or service data are reproduced as desirous program information.

When the aforementioned reception of the digital audio broadcasting signal by the digital audio broadcasting signal receiver is practically carried out, usually one of plural groups of program information data contained in the audio information data or the service information data is selected and desirous program information is reproduced based on the selected program information data which are intermittently obtained. Accordingly, the digital audio broadcasting signal receiver is preferably required to be put in normal operation only in intermittent periods in each of which the desirous program information is reproduced based on the selected program information data.

However, in practice, a digital audio broadcasting signal receiver proposed previously is usually put in normal operation in not only the intermittent periods in each of which the desirous program information is reproduced based on the selected program information data but also other periods in each of which program information other than the selected program information is reproduced. This means that the digital audio broadcasting signal receiver proposed previously brings about power consumption in the periods in each of which program information other than the selected program information is reproduced and therefore the digital audio broadcasting signal receiver is not preferably required to be put in normal operation, in the same manner as in the intermittent periods in each of which the desired program information is reproduced based on the selected program information data. Since power consumption per unit time duration in the digital audio broadcasting signal is relatively large, the power consumption brought in the digital audio broadcasting signal receiver in such a manner as mentioned above excludes substantially the digital audio broadcasting signal receiver proposed previously from practical battery operation. That is, it is very difficult for the digital audio broadcasting signal receiver proposed previously to be formed in a portable type which is able to operate for a relatively long time with power supply from a battery.

OBJECTS AND SUMMARY OF THE INVENTION

Accordingly, it is an object of the present invention to provide an apparatus for receiving broadcasting signals, by which a broadcasting signal carrying synchronous data, control information data and plural groups of program information data is received and desired program information is reproduced based on a group of data selected from the plural groups of program information data carried by the received broadcasting signal, and which avoids the aforementioned disadvantages encountered with the prior art.

Another object of the present invention is to provide an apparatus for receiving broadcasting signals, by which a broadcasting signal carrying synchronous data, control information data and plural groups of program information data is received and desired program information is reproduced based on a group of data selected from the plural groups of program information data carried by the received broadcasting signal, and in which power consumption is effectively reduced so as to make it possible to introduce practical battery operation.

A further object of the present invention is to provide an apparatus for receiving broadcasting signals, by which a broadcasting signal carrying synchronous data, control information data and plural groups of program information data is received and desired program information is reproduced based on a group of data selected from the plural groups of program information data carried by the received broadcasting signal, and which is advantageously formed in a portable type which is able to operate for a relatively long time with power supply from a battery.

According to the present invention, there is provided an apparatus for receiving broadcasting signals, which comprises a signal receiving portion for receiving a broadcasting signal carrying synchronous data, control information data and plural groups of program information data, a frequency converting portion for causing the broadcasting signal received by the signal receiving portion to be subjected to frequency conversion to produce an IF signal, an IF amplifying portion for amplifying the IF signal, an analog to digital converting portion for causing the IF signal derived from the IF amplifying portion to be subjected to analog to digital conversion to produce a digital IF signal, a digital demodulating portion for causing the digital IF signal to be subjected to digital demodulation processing, a program selecting portion for selecting one of plural groups of program information data obtained from the digital demodulating portion, an information reproducing portion for causing the program information data selected by the program selecting portion to be subjected to demodulation processing to reproduce program information, and an operation controlling portion operative to put at least each of the signal receiving portion, the frequency converting portion and the IF amplifying portion in a reduced power consumption state in periods other than a period in which portions of the broadcasting signal, which carry the synchronous data, the control information data and the program information data to be selected by the program selecting portion, respectively, are able to be received by the signal receiving portion.

In an embodiment of apparatus for receiving broadcasting signals according to the present invention, an automatic gain controller for supplying the IF amplifying portion with an automatic gain control signal is provided and the operation controlling portion is operative to cause the automatic gain controller to maintain a specific automatic gain control signal which is obtained just before an inoperative state of each of the signal receiving portion, the frequency converting portion and the IF amplifying portion when each of the signal receiving portion, the frequency converting portion and the IF amplifying portion is put in the inoperative state by the operation controlling portion.

In the apparatus for receiving broadcasting signals thus constituted in accordance with the present invention, in the periods other than the period in which the portions of the broadcasting signal, which carry the synchronous data, the control information data and the program information data to be selected by the program selecting portion, respectively, are able to be received by the signal receiving portion, at least each of the signal receiving portion, the frequency converting portion and the IF amplifying portion is controlled by the operation controlling portion to reduce power consumption.

Further, in the embodiment of apparatus for receiving broadcasting signals according to the present invention, the operation controlling portion is operative to put the analog to digital converting portion and the digital demodulating portion, in addition to the signal receiving portion, the frequency converting portion and the IF amplifying portion, in a reduced power consumption state in the periods other than the period in which the portions of the broadcasting signal, which carry the synchronous data, the control information data and the program information data to be selected by the program selecting portion, respectively, are able to be received by the signal receiving portion.

The operation controlling portion is operative, for putting the signal receiving portion, the frequency converting portion and the IF amplifying portion in the reduce power consumption state, for example, to cut off power supply to each of the signal receiving portion, the frequency converting portion and the IF amplifying portion in order to put each of the signal receiving portion, the frequency converting portion and the IF amplifying portion in the inoperative state or to control bias voltages supplied to the signal receiving portion, the frequency converting portion and the IF amplifying portion, respectively.

Further, the operation controlling portion is operative, for putting the analog to digital converting portion and the digital demodulating portion in the reduce power consumption state, for example, to cut off a clock signal supplied to each of the analog to digital converting portion and the digital demodulating portion in order to put each of the analog to digital converting portion and the digital demodulating portion in an inoperative state.

Accordingly, with the apparatus for receiving broadcasting signals according to the present invention, under a situation that at least each of the signal receiving portion, the frequency converting portion and the IF amplifying portion, in which power consumption is larger than that in any other portion, is put in the reduced power consumption state in the selected periods without hindrance in required operations, so that the whole power consumption in the apparatus is effectively reduced, the broadcasting signal carrying synchronous data, control information data and plural groups of program information data is received and desirous program information can be reproduced based on the program information data selected from the plural groups of program information data carried by the received broadcasting signal.

Especially, in the embodiment of apparatus for receiving broadcasting signals according to the present invention, when each of the signal receiving portion, the frequency converting portion and the IF amplifying portion is put in the inoperative state by the operation controlling portion, the automatic gain controller provided for supplying the IF amplifying portion with the automatic gain control signal is controlled to maintain the specific automatic gain control signal which is obtained just before the inoperative state of each of the signal receiving portion, the frequency converting portion and the IF amplifying portion. Further, in the embodiment of apparatus for receiving broadcasting signals according to the present invention, under a situation that the signal receiving portion contains an RF amplifier for amplifying the received broadcasting signal and the automatic gain controller is operative to supply the RF amplifier in the signal receiving portion, in addition to the IF amplifying portion, with the automatic gain control signal, the automatic gain controller is controlled to maintain the specific automatic gain control signal which is obtained just before the inoperative state of each of the signal receiving portion, the frequency converting portion and the IF amplifying portion when each of the signal receiving portion, the frequency converting portion and the IF amplifying portion is put in the inoperative state by the operation controlling portion.

Consequently, in this embodiment of apparatus for receiving broadcasting signals according to the present invention, when each of the signal receiving portion, the frequency converting portion and the IF amplifying portion having been put in the inoperative state is put again in operation, the automatic gain controller supplies the IF amplifying portion or the IF amplifying portion and the RF amplifier in the signal receiving portion with the specific automatic gain control signal obtained just before the inoperative state of each of the signal receiving portion, the frequency converting portion and the IF amplifying portion so that each of the signal receiving portion, the frequency converting portion and the IF amplifying portion becomes immediately stable in its operation.

As described above, with the apparatus for receiving broadcasting signals according to the present invention, the broadcasting signal carrying synchronous data, control information data and plural groups of program information data can be received and the desired program information can be reproduced based on the program information data selected from the plural groups of program information data carried by the received broadcasting signal with power consumption reduced effectively. Therefore, the apparatus for receiving broadcasting signals according to the present invention is advantageously formed in a portable type which is able to operate for a relatively long time with power supply from a battery.

The above, and other objects, features and advantages of the present invention will be become apparent from the following detailed description taken in conjunction with the accompanying drawings.

DESCRIPTION OF THE PREFERRED EMBODIMENT

Figure 2:
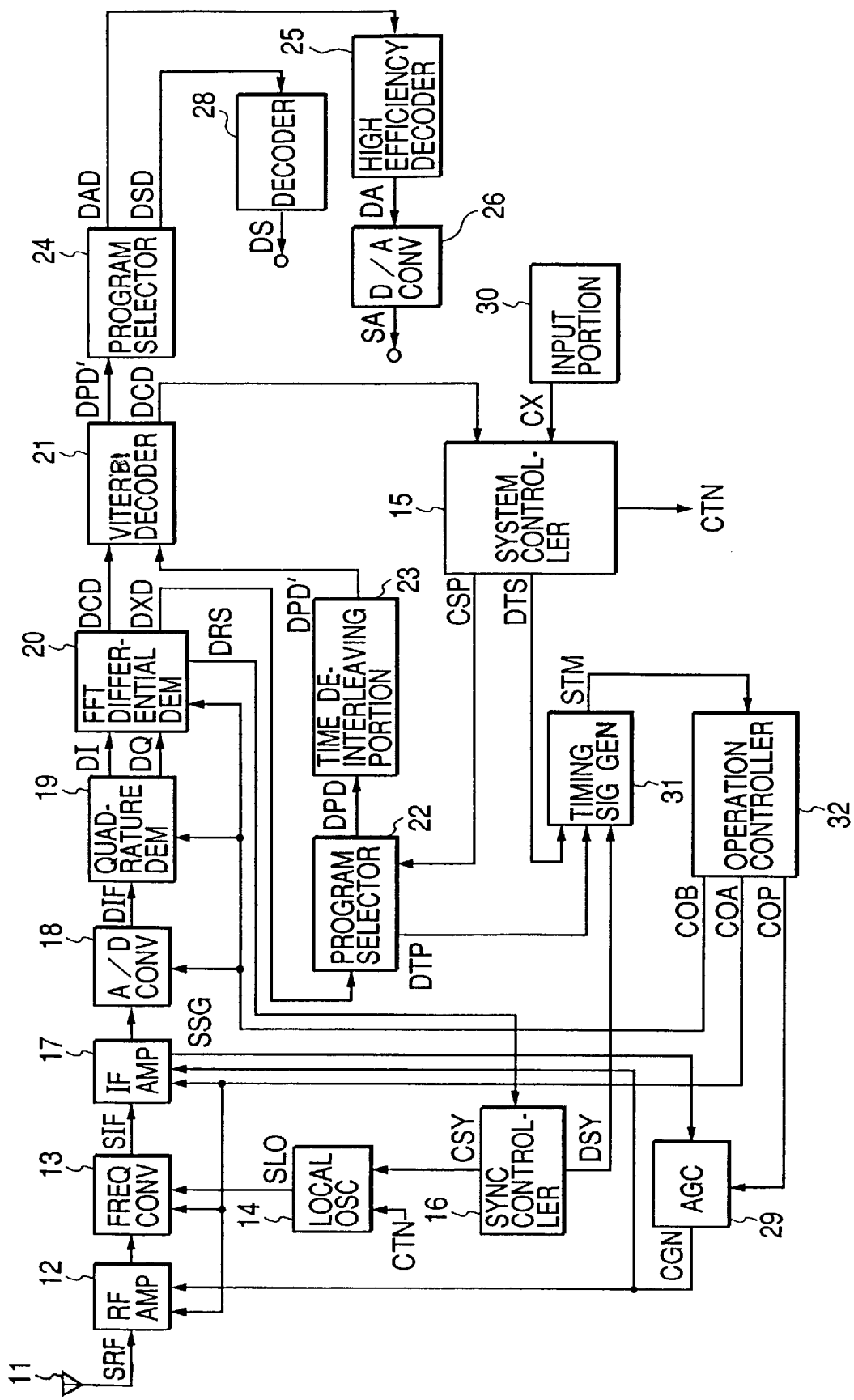
FIG. 2 is a schematic block diagram showing an embodiment of apparatus for receiving broadcasting signals according to the present invention.

FIG. 2 shows schematically an embodiment of apparatus for receiving broadcasting signals according to the present invention. The embodiment shown in FIG. 2 is operative to receive a digital audio broadcasting signal.

Referring to FIG. 2, a digital audio broadcasting signal SRF which is transmitted from a broadcasting stations and selected through an antenna 11 and a tuning portion omitted to be shown in FIG. 2 is supplied to a radio frequency (RF) amplifier 12. The antenna 11, the tuning portion omitted to be shown in FIG. 2 and the RF amplifier 12 as a whole constitute a signal receiving portion.

Figure 1:
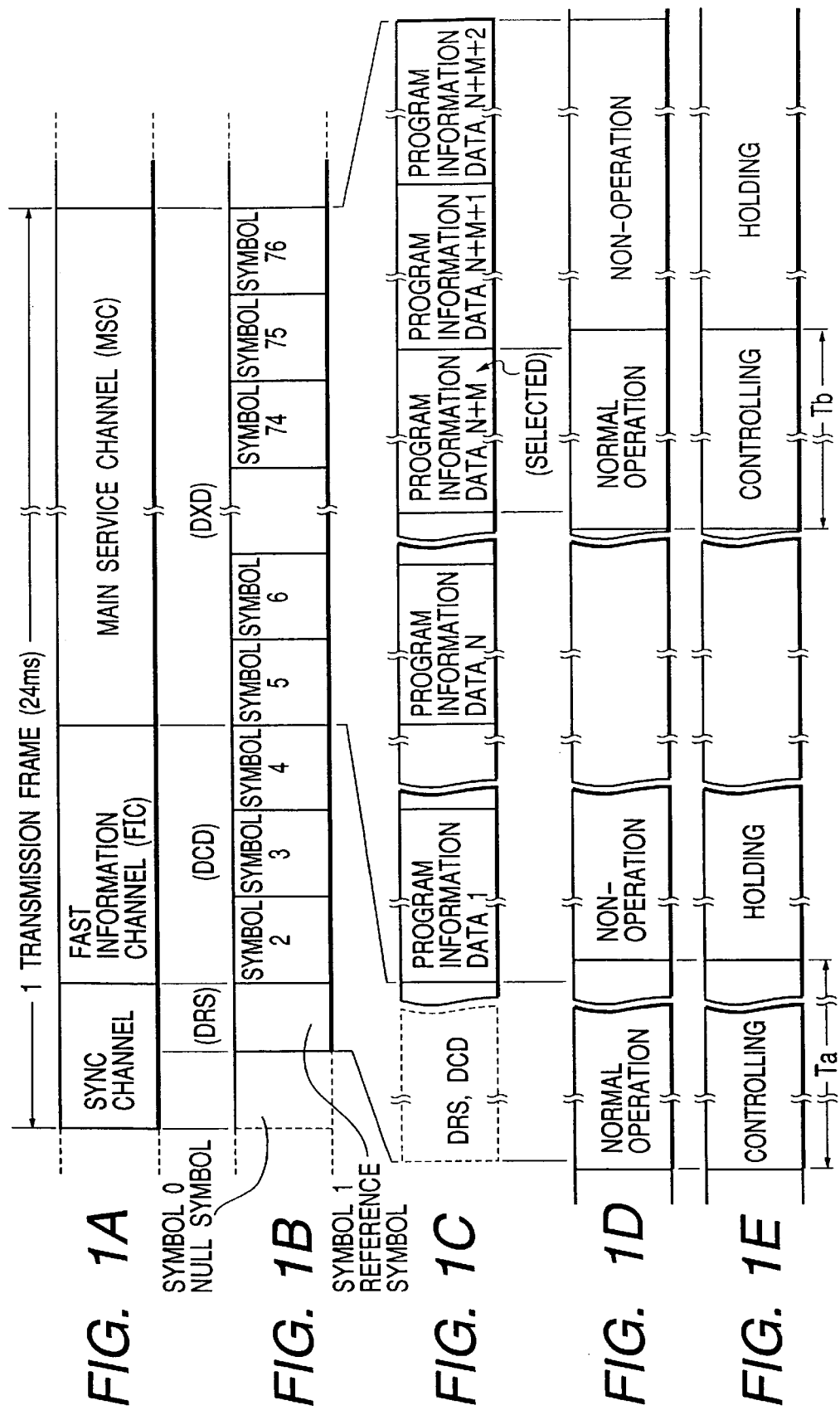
FIGS. 1A to 1E are illustrations showing signal formats used for explaining a digital audio broadcasting signal.

The digital audio broadcasting signal SRF is a modulated wave signal obtained by modulating a carrier wave signal with digital data including synchronous data, control information data and plural groups of program information data in accordance with the OFDM system. The digital data carried by the digital audio broadcasting signal SRF are composed of a series of frame units each called a transmission frame, as shown in FIGS. 1A, 1B and 1C aforementioned. The detailed explanation of the digital audio broadcasting signal SRF will be omitted here.

The digital audio broadcasting signal SRF amplified by the RF amplifier 12 included in the signal receiving portion is supplied to a frequency convertor 13. A local oscillation signal SLO from a local oscillator 14 is also supplied to the frequency convertor 13. The local oscillator 14 is operative to control, in accordance with a tuning control signal CTN supplied from a system controller 15 and a control signal CSY supplied from a synchronizing controller 16, the local oscillation signal SLO to have a frequency appropriate to the carrier frequency of the digital audio broadcasting signal SRF.

In the frequency convertor 13, the digital audio broadcasting signal SRF from the RF amplifier 12 is subjected to frequency-conversion processing with use of the local oscillation signal SLO to produce an intermediate frequency (IF) signal SIF having a predetermined IF. The IF signal SIF obtained from the frequency convertor 13 is amplified by an IF amplifier 17 and supplied to an analog to digital (A/D) convertor 18.

An automatic gain controller (AGC) 29 is provided in relation to the RF amplifier 12 and the IF amplifier 17. A level detection output signal SSG obtained from the IF amplifier 17 in response to the level of the IF signal SIF supplied to the A/D convertor 18 is supplied to the AGC 29 and an AGC signal CGN from the AGC 29 is supplied to the RF amplifier 12 and the IF amplifier 17. The RF amplifier 12 is operative to amplify the digital audio broadcasting signal SRF with a gain controlled by the AGC signal CGN and the IF amplifier 17 is operative to amplify the IF signal SIF with a gain controlled by the AGC signal CGN.

A digital IF signal DIF corresponding to the IF signal SIF amplified by the IF amplifier 17 is obtained from the A/D convertor 18 to be supplied to a quadrature demodulator 19. In the quadrature demodulator 19, the digital IF signal DIF is subjected to quadrature demodulation processing to produce I and Q signals DI and DQ which are a pair of quadrature demodulated output signals.

The I and Q signals DI and DQ obtained from the quadrature demodulator 19 are supplied to a fast Fourier transform (FFT) differential demodulator 20. In the FFT differential demodulator 20, each of the I and Q signals DI and DQ is subjected to transformation from a time domain signal to a frequency domain signal to produce synchronous information data DRS representing synchronous information transmitted through a Synchronous Channel, control information data DCD presenting control information transmitted through a Fast Information Channel (FIC), and composite data DXD composed of audio information data and service information data representing respectively audio information containing plural groups of program information data and service information transmitted through a Main Service Channel (MSC). The audio information data and the service information data constituting the composite data DXD have been subjected to time interleaving arrangements.

The quadrature demodulator 19 and the FFT differential demodulator 20 constitute a digital demodulating portion for causing the digital IF signal DIF obtained from the A/D convertor 18 based on the IF signal SIF to be subjected to digital demodulation processing. The synchronous information data DRS obtained from the FFT differential demodulator 20 are supplied to the synchronizing controller 16, the control information data DCD obtained from the FFT differential demodulator 20 are supplied to a Viterbi decoder 21, and the composite data DXD obtained from the FFT differential demodulator 20 are supplied to a program selector 22.

A program selection control signal CSP is also supplied to the program selector 22 from the system controller 15. In the program selector 22, data selection processing by which one of plural groups of program information data contained in the audio information data constituting the composite data DXD or one of plural groups of program information data contained in the service information data constituting the composite data DXD are selected to be extracted from the audio information data or service information data is carried out in response to the program selection control signal CSP. Since each of the plural groups of program information data contained in the audio information data constituting the composite data DXD and each of the plural groups of program information data contained in the service information data constituting the composite data DXD have been subjected to the time interleaving arrangement, time interleaved program information data DPD selected by the data selection processing are derived from the program selector 22 to a time de-interleaving portion 23.

In the time de-interleaving portion 23, the time interleaved program information data DPD selected through the program selector 22 are subjected to time de-interleaving arrangement to be released from the time interleaving arrangement. In the time de-interleaving arrangement to which the time interleaved program information data DPD selected through the program selector 22 are subjected, each of interleaving completion segments of the time interleaved program information data DPD is successively supplied to a memory to be once stored therein, and then, each of the interleaving completion segments stored in the memory is read from the memory in a predetermined de-interleaving manner so as to produce time de-interleaved program information data DPD'. As a result, the time de-interleaved program information data DPD' are obtained from the time de-interleaving portion 23 to be supplied to the Viterbi decoder 21.

In the Viterbi decoder 21, the control information data DCD from the FFT differential demodulator 20 and the time de-interleaved program information data DPD' from the time de-interleaving portion 23 are subjected respectively to error correction processings. Then, the time de-interleaved program information data DPD' subjected to the error correction processing are supplied from the Viterbi decoder 21 to a program selector 24 and the control information data DCD subjected to the error correction processing are supplied from the Viterbi decoder 21 to the system controller 15.

Audio program data DAD or service program data DSD which are obtained from the Viterbi decoder 21 based on the time de-interleaved program information data DPD' subjected to the error correction processing in the Viterbi decoder 21 are derived from the program selector 24.

The audio program data DAD derived from the program selector 24 are supplied to a high efficiency decoder 25. In the high efficiency decoder 25, the audio program data DAD are subjected to high efficiency decoding by which data suppressed in accordance with a high efficiency coding are expanded to produce decoded audio data DA. The decoded audio data DA obtained from the high efficiency decoder 25 are supplied to a digital to analog (D/A) convertor 26 to be converted to an analog sound signal forming a reproduced audio signal SA corresponding to the decoded audio data DA. The reproduced audio signal SA is derived from the D/A convertor 26 at an output terminal.

The service program data DSD derived from the program selector 24 are supplied to a decoder 28. In the decoder 28, the service program data DSD are subjected to decoding processing to produce reproduced service data DS based on the service program data DSD. The reproduced service data DS are derived from the decoder 28 at an output terminal.

The Viterbi decoder 21, the time de-interleaving portion 23, the program selector 24, the high efficiency decoder 25 and the decoder 28 as a whole constitute an information reproducing portion for causing the time interleaved program information data DPD selected by the program selector 22 to be subjected to demodulation processing to reproduce program information in the form of the decoded audio data DA or the reproduced service data DS.

The system controller 15 is operative to produce the program selection control signal CSP based on program structure information represented by the control information data DCD from the Viterbi decoder 21 and designated program information represented by a command signal CX supplied from an input portion 30 in response to manipulations thereon and to supply the program selector 22 with the program selection control signal CSP so as to cause the program selector 22 to carry out the data selection processing in response to the program selection control signal CSP.

The system controller 15 is operative further to produce timing data DTS representing a time at which the control information data DCD are obtained in response to the control information data DCD supplied from the Viterbi decoder 21 and to supply a timing signal generator 31 with the timing data DTS.

The synchronizing controller 16 is operative to produce the control signal CSY in accordance with the synchronous information represented by the synchronous information data DRS from the FFT differential demodulator 20 and to supply the local oscillator 14 with the control signal CSY. The synchronizing controller 16 is operative further to produce timing data DSY representing a time at which the synchronous information data DRS are obtained in response to the synchronous information data DRS supplied from the FFT differential demodulator 20 and to supply the timing signal generator 31 with the timing data DSY.

In addition, timing data DTP representing a time at which the time interleaved program information data DPD selected through the program selector 22 is obtained to be supplied to the timing signal generator 31 from the program selector 22.

In the timing signal generator 31 to which the timing data DTS from the system controller 15, the timing data DSY from the synchronizing controller 16 and the timing data DTP from the program selector 22 are supplied, a timing signal STM which represents a period in which portions of the digital audio broadcasting signal SRF supplied through the antenna 11 to the RF amplifier 12, which carry the synchronous information data DRS, the control information data DCD and the time interleaved program information data DPD to be selected through the program selector 22, respectively, are able to be received by the signal receiving portion including the RF amplifier 12 (hereinafter, this period will be referred to as a selected data receivable period), is generated in response to the time represented by the timing data DSY, at which the synchronous information data DRS are obtained, the time represented by the timing data DTS, at which the control information data DCD are obtained, and the time represented by the timing data DTP, at which the time interleaved program information data DPD selected through the program selector 22 is obtained.

The timing signal STM thus generated in the timing signal generator 31 has, for example, a portion of high level corresponding to each selected data receivable period and another portion of low level corresponding to each of periods other than the selected data receivable period.

In the case where a portion of the digital audio broadcasting signal SRF which carries the control information data DCD and a portion of the digital audio broadcasting signal SRF which carries the time interleaved program information data DPD to be selected through the program selector 22 are adjacent to each other, the selected data receivable period begins a little earlier than the beginning of an exact period during which the portions of the digital audio broadcasting signal SRF, which carry the synchronous information data DRS, the control information data DCD and the time interleaved program information data DPD to be selected through the program selector 22, respectively, are actually received by the signal receiving portion including the RF amplifier 12 and terminates a little later than the termination of the exact period.

On the other hand, in the case where the portion of the digital audio broadcasting signal SRF which carries the control information data DCD and the portion of the digital audio broadcasting signal SRF which carries the time interleaved program information data DPD to be selected through the program selector 22 are apart from each other, the selected data receivable period is divided into two parts, one of which begins a little earlier than the beginning of a first exact period during which the portions of the digital audio broadcasting signal SRF, which carry the synchronous information data DRS and the control information data DCD, respectively, are actually received by the signal receiving portion including the RF amplifier 12 and terminates a little later than the termination of the first exact period, and the other of which begins a little earlier than the beginning of a second exact period during which the portion of the digital audio broadcasting signal SRF, which carries the time interleaved program information data DPD to be selected through the program selector 22 is actually received by the signal receiving portion including the RF amplifier 12 and terminates a little later than the termination of the second exact period.

The timing signal STM obtained from the timing signal generator 31 is supplied to an operation controller 32. The operation controller 32 is operative to produce control signals COA, COB and COP in response to the timing signal STM and to supply each of the RF amplifier 12, the frequency convertor 13 and the IF amplifier 17 with the control signal COA, each of the A/D convertor 18, the quadrature demodulator 19 and the FFT differential demodulator 20 with the control signal COB, and the AGC 29 with the control signal COP.

In such operations of the operation controller 32, the control signal COA is so formed as to put each of the RF amplifier 12, the frequency convertor 13 and the IF amplifier 17 in normal operation in the selected data receivable period and to put each of the RF amplifier 12, the frequency convertor 13 and the IF amplifier 17 in a reduced power consumption state in the periods other than the selected data receivable period. The control signal COB is so formed as to put each of the A/D convertor 18, the quadrature demodulator 19 and the FFT differential demodulator 20 in normal operation in the selected data receivable period and to put each of the A/D convertor 18, the quadrature demodulator 19 and the FFT differential demodulator 20 in a reduced power consumption state in the periods other than the selected data receivable period.

When each of the RF amplifier 12, the frequency convertor 13 and the IF amplifier 17 is put in the reduced power consumption state by the control signal COA from the operation controller 32, for example, power supply to each of the RF amplifier 12, the frequency convertor 13 and the IF amplifier 17 is cut off so as to put each of the signal receiving portion, the frequency converting portion and the IF amplifying portion in the inoperative state. Similarly, when each of each of the A/D convertor 18, the quadrature demodulator 19 and the FFT differential demodulator 20 is put in the reduced power consumption state by the control signal COB from the operation controller 32, for example, a clock signal supplied to each of the RF amplifier 12, the frequency convertor 13 and the IF amplifier 17 is cut off so as to put each of each of the A/D convertor 18, the quadrature demodulator 19 and the FFT differential demodulator 20 in the inoperative state.

Further, the control signal COP generated in the operation controller 32 is so formed as to cause the AGC 29 to produce the AGC signal CGN varying in response to the level detection output signal SSG from the IF amplifier 17 and to supply each of the RF amplifier 12 and the IF amplifier 17 in the selected data receivable period and as to cause the AGC 29 to maintain the AGC signal CGN which is obtained just before the inoperative state of each of the RF amplifier 12 and the IF amplifier 17 in the periods other than the selected data receivable period.

Under a situation in which the above described control operation is carried out by the operation controller 32, when the synchronous information data DRS, the control information data DCD and the composite data DXD containing the plural groups of program information data are carried by the digital audio broadcasting signal SRF, for example, as shown in FIG. 1C, and program information data N+M are to be selected through the program selector 22 as the time interleaved program information data DPD, each of the RF amplifier 12, the frequency convertor 13, the IF amplifier 17, the A/D convertor 18, the quadrature demodulator 19 and the FFT differential demodulator 20 is put in normal operation in periods Ta and Tb which correspond to the selected data receivable period and put in the inoperative state (non-operation) in periods other than the periods Ta and Tb, which correspond to the periods other than the selected data receivable period, as shown in FIG. 1D. The period Ta begins a little earlier than the beginning of a first exact period during which the portions of the digital audio broadcasting signal SRF, which carry the synchronous information data DRS and the control information data DCD, respectively, are actually received by the signal receiving portion including the RF amplifier 12 and terminates a little later than the termination of the first exact period. The period Tb begins a little earlier than the beginning of a second exact period during which the portion of the digital audio broadcasting signal SRF, which carries the program information data N+M, is actually received by the signal receiving portion including the RF amplifier 12 and terminates a little later than the termination of the second exact period.

Further, the AGC 29 is put in a controlling state for varying the AGC signal CGN in response to the level detection output signal SSG from the IF amplifier 17 in the periods Ta and Tb and put in a holding state for maintaining the AGC signal CGN which is obtained just before the inoperative state of each of the RF amplifier 12 and the IF amplifier 17 in the periods other than the periods Ta and Tb, as shown in FIG. 1E.

Consequently, in the embodiment shown in FIG. 2, under the situation that the normal operation is appropriately carried out to reproduce desirably selected program information in the selected data receivable period, for example, each of the RF amplifier 12, the frequency convertor 13, the IF amplifier 17, the A/D convertor 18, the quadrature demodulator 19 and the FFT differential demodulator 20, in which power consumption is larger than that in any other circuit portion, is put in the reduced power consumption state in the periods other than the selected data receivable period, so that the whole power consumption in the embodiment is effectively reduced. Therefore, the embodiment shown in FIG. 2 is advantageously formed in a portable type which is able to operate for a relatively long time with power supply from a battery.

Further, in the embodiment shown in FIG. 2, although each of the RF amplifier 12, the frequency convertor 13, the IF amplifier 17, the A/D convertor 18, the quadrature demodulator 19 and the FFT differential demodulator 20 is put in the inoperative state so as to be put in the reduced power consumption state in the periods other than the selected data receivable period, since the AGC 29 is controlled to maintain the AGC signal CGN which is obtained just before the inoperative state of each of the RF amplifier 12, the frequency convertor 13 and the IF amplifier 17 in the periods other than the selected data receivable period, each of the RF amplifier 12, the frequency convertor 13 and the IF amplifier 17 is supplied from the AGC 29 with the AGC signal CGN which is obtained just before the inoperative state of each of the RF amplifier 12, the frequency convertor 13 and the IF amplifier 17 and therefore becomes immediately stable in its operation when each of the RF amplifier 12, the frequency convertor 13, the IF amplifier 17, the A/D convertor 18, the quadrature demodulator 19 and the FFT differential demodulator 20 is put again in operation in the next selected data receivable period.

Although each of the RF amplifier 12, the frequency convertor 13, the IF amplifier 17, the A/D convertor 18, the quadrature demodulator 19 and the FFT differential demodulator 20 is put in the inoperative state so as to be put in the reduced power consumption state in the periods other than the selected data receivable period in the embodiment shown in FIG. 2, it is also possible to control bias voltages supplied to the RF amplifier 12, the frequency convertor 13, the IF amplifier 17, the A/D convertor 18, the quadrature demodulator 19 and the FFT differential demodulator 20, respectively, so as to put each of the RF amplifier 12, the frequency convertor 13, the IF amplifier 17, the A/D convertor 18, the quadrature demodulator 19 and the FFT differential demodulator 20 in the reduced power consumption state, without putting each of the RF amplifier 12, the frequency convertor 13, the IF amplifier 17, the A/D convertor 18, the quadrature demodulator 19 and the FFT differential demodulator 20 in the inoperative state.

Besides, although each of the RF amplifier 12, the frequency convertor 13, the IF amplifier 17, the A/D convertor 18, the quadrature demodulator 19 and the FFT differential demodulator 20 is put in the reduced power consumption state in the periods other than the selected data receivable period in the embodiment shown in FIG. 2, it is also advantageous to put at least each of the RF amplifier 12, the frequency convertor 13 and the IF amplifier 17 in the reduced power consumption state in the periods other than the selected data receivable period, without putting each of the RF amplifier 12, the frequency convertor 13, the IF amplifier 17, the A/D convertor 18, the quadrature demodulator 19 and the FFT differential demodulator 20 in the reduced power consumption state.

What is claimed is:

1. Apparatus for receiving broadcasting signals, comprising:

signal receiving means for receiving a broadcasting signal carrying synchronous data, control information data and a plurality of groups of program information data, frequency converting means for frequency converting the broadcasting signal received by said signal receiving means to produce an intermediate frequency signal, intermediate frequency amplifying means for amplifying the intermediate frequency signal, analog to digital converting means for analog-to-digital converting the intermediate frequency signal derived from said intermediate frequency amplifying means to produce a digital intermediate frequency signal, digital demodulating means for demodulating the digital intermediate frequency signal to produce a digital demodulated signal, program selecting means for selecting one of the plurality of groups of program information data in the digital demodulated signal obtained from said digital demodulating means, information reproducing means for causing the one of the plurality of groups of program information data selected by said program selecting means to be subjected to demodulation processing to reproduce program information, and operation controlling means operative to put at least said signal receiving means, said frequency converting means and said intermediate frequency amplifying means in a reduced power consumption state in periods other than a period in which portions of the broadcasting signal, which carry the synchronous data, the control information data and the plurality of groups of program information data to be selected by said program selecting means, respectively, are able to be received by said signal receiving means.

2. The apparatus for receiving broadcasting signals according to claim 1, wherein said operation controlling means is further operative to put said analog to digital converting means and said digital demodulating means in the reduced power consumption state in the periods other than the period in which the portions of broadcasting signal, which carry the synchronous data, the control information data and the plurality of groups of program information data to be selected by said program selecting means, respectively, are able to be received by said signal receiving means.

3. The apparatus for receiving broadcasting signals according to claim 1, wherein said operation controlling means is further operative, upon putting said signal receiving means, said frequency converting means and said intermediate frequency amplifying means in the reduced power consumption state, for putting said signal receiving means, said frequency converting means and said intermediate frequency amplifying means in an inoperative state.

4. The apparatus for receiving broadcasting signals according to claim 3, wherein said operation controlling means is further operative, upon putting said signal receiving means, said frequency converting means and said intermediate frequency amplifying means in the inoperative state, for cutting off a power supply to said signal receiving means, said frequency converting means and said intermediate frequency amplifying means.

5. The apparatus for receiving broadcasting signals according to claim 3, further comprising automatic gain controlling means for supplying the intermediate frequency amplifying means with an automatic gain control signal and said operation controlling means is operative to cause said automatic gain controlling means to maintain a specific automatic gain control signal which is obtained just before the inoperative state of each of said signal receiving means, said frequency converting means and said intermediate frequency amplifying means when each of said signal receiving means, said frequency converting means and said intermediate frequency amplifying means is put in the inoperative state by said operation controlling means.

6. The apparatus for receiving broadcasting signals according to claim 5, wherein said signal receiving means includes radio frequency amplifying means for amplifying the broadcasting signal received by said signal receiving means, and said automatic gain controlling means supplies said intermediate frequency amplifying means and said radio frequency amplifying means with the automatic gain control signal.

7. The apparatus for receiving broadcasting signals according to claim 1, wherein said operation controlling means is operative, for putting said signal receiving means, said frequency converting means and said intermediate frequency amplifying means in the reduced power consumption state, to control bias voltages supplied to said signal receiving means, said frequency converting means and said intermediate frequency amplifying means, respectively.

8. The apparatus for receiving broadcasting signals according to claim 2, wherein said operation controlling means is further operative, for putting each of said analog to digital converting means and said digital demodulating means in the reduced power consumption state, for putting said analog to digital converting means and said digital demodulating means in an inoperative state.

9. The apparatus for receiving broadcasting signals according to claim 8, wherein said operation controlling means is further operative, for putting each of said analog to digital converting means and said digital demodulating means in the inoperative state, for cutting off a clock signal supplied to each of said analog to digital converting means and said digital demodulating means.

10. The apparatus for receiving broadcasting signals according to claim 1, further comprising timing signal generating means operative to detect the periods other than the period in which the portions of the broadcasting signal, which carry the synchronous data, the control information data and the plurality of groups of program information data to be selected by said program selecting means, respectively, are able to be received by said signal receiving means in response to synchronous information data and program structure data obtained from said digital demodulating means and the program information data selected by said program selecting means and to produce a detection output signal, and to supply said operation controlling means with a timing signal indicating operational timings for said operation controlling means in response to the detection output signal.

* * * * *